J. H. COOK.
PLANT PROTECTOR.
APPLICATION FILED APR. 13, 1916.

1,245,441.

Patented Nov. 6, 1917.

WITNESSES
Howard F. Costello
Wm H. Mulligan

INVENTOR
John H. Cook
BY Richard Owen
ATTORNEY

UNITED STATES PATENT OFFICE.

JOHN H. COOK, OF SAN MARCOS, TEXAS.

PLANT-PROTECTOR.

1,245,441.  Specification of Letters Patent.  Patented Nov. 6, 1917.

Application filed April 13, 1916.  Serial No. 90,923.

*To all whom it may concern:*

Be it known that I, JOHN H. COOK, a citizen of the United States, residing at San Marcos, in the county of Hays and State of Texas, have invented certain new and useful Improvements in Plant-Protectors, of which the following is a specification.

This invention relates to new and useful improvements in plant protectors and the primary object of the invention is to provide a foraminous hood for young plants, particularly melon, vegetable and other similar plants which are subjected to the attack of worms, grubs, lice and other such pests which infest gardens when the plants are young and easily destroyed.

The invention further aims to provide a device of this character which will prevent young plants from being destroyed by heavy rains or strong winds and at the same time allowing plenty of moisture to reach the growing plant.

A further object of this invention is the provision of a plant protector which consists of comparatively few parts and is simple in construction, but durable and well adapted to withstand the usage to which devices of this character are ordinarily subjected.

Figure 1:
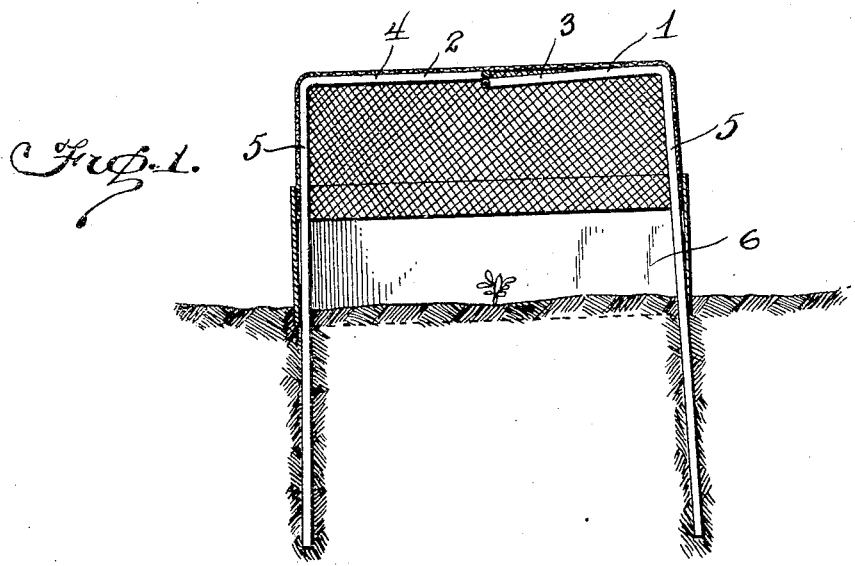

For a full description of the invention and the advantages and merits thereof, reference is to be had to the following description and the accompanying drawings, wherein is illustrated the preferred form of my invention, in which, Figure 1 is a vertical section through the device showing it in use.

Figure 2:
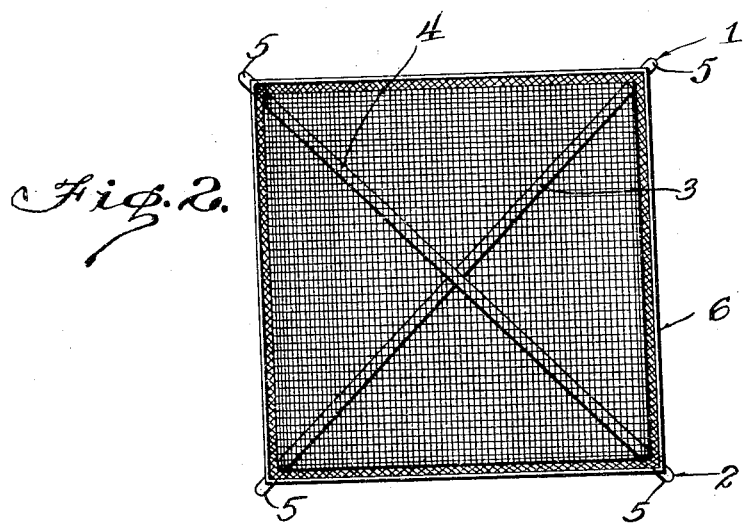

Fig. 2 is a top plan view thereof.

The device consists of a supporting frame which is formed of a pair of supporting elements 1 and 2 which are constructed in the form of inverted U-shaped members, the top supporting bars 3 and 4 of which, are arranged diagonally across the device from one corner to another, and cross each other at the center of the protector. Depending from the end of each of the supporting bars 3 and 4 are supporting legs 5 which are of considerable length and adapted to be extended deeply and firmly into the ground for rigidly supporting the protector against displacement by strong winds. The supporting legs 5 are disposed outwardly at an angle to the vertical center line of the protector and from this manner of construction provision is made whereby a number of plant protectors may be stacked one upon the other for compact assembly while the protectors are being shipped from one point to another.

Mounted on the supporting elements is a foraminous hood which is preferably constructed of wire mesh and which has the lower edges of its sides extending downwardly for about half the distance between the top of the protector and the surface of the ground, while the top of the hood is, by virtue of the diagonal disposition of the supporting bars 4 held in a horizontal plane for preventing the top from sagging inwardly and obviating the possibility of leaves or other similar debris from accumulating at the top thereof. The wire mesh effectively breaks the force of a heavy downfall of rain which would otherwise destroy the young plants but allows the plants to receive plenty of rain and moisture which is necessary for their proper development. The supporting legs 5 form a corner brace for the hood and the hood may be removed from the legs without necessarily extracting the supporting legs 5 from the soil in which they are embedded for supporting the plant protector.

In order that the plant may be protected from the attack of insects or ground burrowing pests the device is provided with an impregnable shield 6 which is constructed of metal and extends around the perimeter of the lower edge of the foraminous hood and is of a width sufficient to allow its lower edge to be extended into the ground for a depth equal to the depth of the roots of the young plant.

It will be observed that each of the elements namely, the foraminous hood, the shield, and the supporting elements are independent of each other inasmuch as the hood may be removed while the shield is still in use, or the shield may be removed without disturbing the hood, while the hood and supporting members may be removed without necessarily disturbing the shield.

From the foregoing it will be observed that a very simple and durable plant protector has been provided, the details of which embody the preferred form. I desire it to be understood however, that slight changes or modifications in the minor details of construction may be made without departing from the spirit of the invention or the scope of the claim hereunto appended.

I claim:

A plant protector, the combination with a frame comprising a pair of U-shaped members formed of single lengths of heavy wire, the legs of the U-shaped members providing legs for the frame adapted to have their ends extend into the ground, of a foraminous hood adapted to loosely rest upon the frame and of a height slightly greater than half the distance between the surface of the ground and the top of said frame, and a shield for coöperating with or adapted to be used independently of the hood, the said shield having its rear edge overlapping the lower edge of the said hood and removably contacting therewith whereby the said shield and the said hood may be used independently of each other.

In testimony whereof I affix my signature in presence of two witnesses.

JOHN H. COOK.

Witnesses:
 LOUIS T. DUGGER,
 K. D. BIGGS.

Copies of this patent may be obtained for five cents each, by addressing the "Commissioner of Patents, Washington, D. C."